US011979481B2

(12) United States Patent
Hoffleit et al.

(10) Patent No.: US 11,979,481 B2
(45) Date of Patent: May 7, 2024

(54) TIME SYNCHRONISATION

(71) Applicant: Renesas Electronics Corporation, Tokyo (JP)

(72) Inventors: Thorsten Hoffleit, Duesseldorf (DE); Christian Mardmoeller, Duesseldorf (DE); Hansjoerg Berberich, Duesseldorf (DE)

(73) Assignee: Renesas Electronics Corporation, Tokyo (JP)

( * ) Notice: Subject to any disclaimer, the term of this patent is extended or adjusted under 35 U.S.C. 154(b) by 461 days.

(21) Appl. No.: 17/166,701

(22) Filed: Feb. 3, 2021

(65) Prior Publication Data
US 2021/0258136 A1 Aug. 19, 2021

(30) Foreign Application Priority Data

Feb. 7, 2020 (EP) .................................... 20156217

(51) Int. Cl.
*G06F 1/14* (2006.01)
*G06F 1/12* (2006.01)
*H04J 3/06* (2006.01)
*H04L 7/00* (2006.01)

(52) U.S. Cl.
CPC .............. *H04L 7/0016* (2013.01); *G06F 1/14* (2013.01); *H04J 3/0661* (2013.01)

(58) Field of Classification Search
CPC ..................................... G06F 1/14; G06F 1/12
See application file for complete search history.

(56) References Cited

U.S. PATENT DOCUMENTS

| | | | | |
|---|---|---|---|---|
| 5,945,944 A | * | 8/1999 | Krasner | G01S 19/256 342/357.46 |
| 7,720,110 B2 | * | 5/2010 | Spalink | H04L 12/4035 370/503 |
| 9,880,949 B1 | * | 1/2018 | Hanchinal | G06F 13/4068 |
| 2006/0041700 A1 | * | 2/2006 | Atago | G06F 13/362 710/107 |
| 2006/0173952 A1 | * | 8/2006 | Coyle | H04L 69/28 709/203 |
| 2007/0116062 A1 | * | 5/2007 | Spalink | H04L 12/40078 370/503 |
| 2008/0080605 A1 | * | 4/2008 | Tan | H04L 1/205 375/226 |
| 2009/0160699 A1 | * | 6/2009 | Gould | G01S 5/021 342/189 |

(Continued)

*Primary Examiner* — Phil K Nguyen
(74) *Attorney, Agent, or Firm* — SCULLY, SCOTT, MURPHY & PRESSER, P.C.

(57) ABSTRACT

An integrated circuit, for example, a system-on-a-chip is disclosed. The integrated circuit includes a timing synchronisation unit including a hardware timer, for example, a gPTP timer. The integrated circuit also includes a non-Ethernet network interface, for example, a PCIe interface, for communicating with another integrated circuit having another hardware timer. The timing synchronisation unit is configured, in response to receiving a timing trigger from the other integrated circuit, to capture a local time t2. The timing synchronisation unit is further configured to provide the local time t2 to a processor for the processor to compute a timing offset between a remote time t1 of the other hardware timer which generated the timing trigger and the local time for time synchronisation.

11 Claims, 15 Drawing Sheets

(56) References Cited

U.S. PATENT DOCUMENTS

| | | | | |
|---|---|---|---|---|
| 2012/0159001 A1* | 6/2012 | Liu | ............ | H04L 69/02 |
| | | | | 709/248 |
| 2012/0278421 A1* | 11/2012 | Sun | ............ | H04Q 9/00 |
| | | | | 709/208 |
| 2014/0118000 A1* | 5/2014 | Pan | ............ | G01R 31/08 |
| | | | | 324/537 |
| 2017/0201606 A1* | 7/2017 | Ding | ............ | G06F 1/14 |

* cited by examiner

TIME SYNCHRONISATION

CROSS-REFERENCE TO RELATED APPLICATIONS

The subject application claims priority to European Patent Application No. EP20156217.0, filed on Feb. 7, 2020. The entire disclosure of European Patent Application No. EP20156217.0 is incorporated by this reference.

BACKGROUND

The present invention relates to time synchronisation, preferably, but not exclusively in for time-sensitive networking complying with IEEE 802.1AS.

Ethernet is increasing being deployed in automobiles. For example, Ethernet Audio Video Bridging (AVB) is a real-time Ethernet standard for transmitting audio and video. Ethernet Time-Sensitive Networking (TSN) is an extension of Ethernet AVB and provides several features including time synchronization as well as traffic scheduling, frame pre-emption and ingress policing. It is a high-speed network technology capable of supporting autonomous driving applications and can be used to connect electronic control units (ECU) in a vehicle.

Ethernet TSN employs a hierarchy of clocks in the network which are synchronized. This is done in accordance with the generic Precision Time Protocol (gPTP) profile defined in IEEE 802.1AS (which is incorporated herein by reference). gPTP uses an exchange of time-stamped messages to communicate time from a master clock through the network via bridges to end-point devices, and so provide time synchronisation and a so-called "transparent clock".

Although there is a move to increasingly use Ethernet, chip-to-chip communication may still employ buses and links, such as peripheral component interconnect express (PCIe), for reasons of cost. Such buses, however, may not support time synchronisation.

SUMMARY

According to a first aspect of the present invention there is provided an integrated circuit (a "first integrated circuit") comprising a timing synchronisation unit which includes a hardware timer and a non-Ethernet network interface for communicating with another integrated circuit having another hardware timer. The timing synchronisation unit is configured, in response to receiving a timing trigger from the other integrated circuit, to capture a local time, t2, using the hardware timer. The timing synchronisation unit is further configured to provide the local time, t2, to a processor for the processor to compute a timing offset between a remote time, t1, of the hardware timer which generated the timing trigger and the local time for time synchronisation.

The first integrated circuit may be a microcontroller or a system-on-a-chip (SoC). The first integrated circuit may include the processor for computing the timing offset. The first integrated circuit may include more than one processor. The processor may be configured to receive an interrupt generated in response to receiving a timing trigger. The timing synchronisation unit may be configured to generate the interrupt. The processor may be configured, in response to receiving the interrupt, to read the other timer via the non-Ethernet network interface to obtain a remote time, t1'. The processor may be configured to compute an offset between the remote time, t1', and the local time t2. The processor is configured to cause a change in operation of the hardware timer in dependence on the offset.

The hardware timer may be a gPTP or PTP timer.

In the first integrated circuit, the non-Ethernet network interface may comprise a peripheral component interconnect express, PCIe, interface. The first integrated circuit may include at least one time-sensitive networking Ethernet network interface. The at least one time-sensitive networking Ethernet network interface may comply with IEEE 802.1AS. The at least one time-sensitive networking Ethernet network interface may comply with IEEE 802.1Q-2018 (e.g., Enhancements for Scheduled Traffic).

The first integrated circuit may include an interconnect for connecting the timing synchronisation unit and the non-Ethernet network interface and, if present, the processor and the at least one time-sensitive networking Ethernet network interface.

The first integrated circuit may comprise a pin for receiving the timing trigger and a path for transmitting the timing trigger from the pin to the timing synchronisation unit. The timing trigger may be a pps.

According to a second aspect of the present invention there is provided an integrated circuit (a "second integrated circuit") comprising a time-sensitive networking Ethernet network interface, a timing synchronisation unit including a hardware timer and a non-Ethernet network interface for communicating with another integrated circuit having another hardware timer. The timing synchronisation unit is (further) configured to provide the local time, t2, to a processor in the other integrated circuit or in another integrated circuit for the processor to compute a timing offset between a remote time, t1, of the hardware timer which generated the timing trigger and the local time for time synchronisation.

The second integrated circuit may not include the processor for computing the timing offset. The second integrated circuit may be an application-specific integrated circuit. The second integrated circuit may be a switch, for example, an Ethernet switch.

The hardware timer may be a gPTP or PTP timer.

In the second integrated circuit, the non-Ethernet network interface may comprise a peripheral component interconnect express, PCIe, interface. The second integrated circuit may include more than one, time-sensitive networking Ethernet network interface(s). The at least one time-sensitive networking Ethernet network interface may comply with EEE 802.1AS. The at least one time-sensitive networking Ethernet network interface may comply with IEEE 802.1Q-2018 or IEEE 1588.

The second integrated circuit may include an interconnect for connecting the timing synchronisation unit and the non-Ethernet network interface and, if present, the processor and the at least one time-sensitive networking Ethernet network interface.

The second integrated circuit may be configured to generate a timing trigger. The timing trigger may be generated cyclically or on demand. The timing synchronisation unit may be configured to generate the timing trigger.

According to a third aspect of the present invention there is provided an integrated circuit (a "third integrated circuit") comprising a timing synchronisation unit which includes a hardware timer and a non-Ethernet network interface for communicating with another integrated circuit having a hardware timer. The non-Ethernet network interface is configured to receive time from the hardware timer for time-stamping messages exchanged with the other integrated circuit.

The third integrated circuit may be a microcontroller or a system-on-a-chip (SoC), or may be an application-specific integrated circuit. The third integrated circuit may be a switch.

The third integrated circuit may include the processor for computing the timing offset or may not include the processor. The third integrated circuit may include more than one processor. For example, in the case that the third integrated circuit is microcontroller or system-on-a chip (as opposed to an Ethernet switch), the processor may be configured to receive an interrupt generated in response to receiving a timing trigger. The timing synchronisation unit may be configured to generate the interrupt. The processor may be configured, in response to receiving the interrupt, to read the other hardware timer via the non-Ethernet network interface to obtain a remote time, t1'. The processor may be configured to compute an offset between the remote time, t1', and the local time t2. The processor is configured to cause a change in operation of the timer in dependence on the offset.

The timer may be a gPTP or PTP timer.

In the third integrated circuit, the non-Ethernet network interface may comprise a peripheral component interconnect express, PCIe, interface. The non-Ethernet network interface may implement precision time measurement (PTM). The non-Ethernet network interface may comprise a switch (or "switching element"), such as a multiplexer, for selecting between the time from the hardware timer (for example, a gPTP timer) and another time from another, different timer (for example, a PTM timer).

The third integrated circuit may include at least one, optionally more than one, time-sensitive networking Ethernet network interface(s). The at least one time-sensitive networking Ethernet network interface may comply with EEE 802.1AS. The at least one time-sensitive networking Ethernet network interface may comply with IEEE 802.1Q-2018 or IEEE 1588.

The third integrated circuit may include an interconnect for connecting the timing synchronisation unit and the non-Ethernet network interface and, if present, the processor and the at least one time-sensitive networking Ethernet network interface.

The third integrated circuit may be configured to generate a timing trigger. The timing trigger may be generated cyclically, on demand and/or in response to an event. The timing synchronisation unit may be configured to generate the timing trigger.

According to a fourth aspect of the present invention there is provided apparatus comprising a first integrated circuit (which may be a microcontroller or SoC) and a second integrated circuit (which may be a switch, such as an Ethernet switch) connected by a non-Ethernet network link via the non-Ethernet network interfaces. The apparatus may be a server. The apparatus may comprise a plurality of second integrated circuits.

According to a fifth aspect of the present invention there is provided apparatus comprising at least two integrated circuits respectively comprising a third integrated circuit connected by at least one non-Ethernet network link via respective non-Ethernet network interfaces. One of the at least two integrated circuits may be a microcontroller or SoC and at least one of the other integrated circuits may be switch. The respective time-sensitive networking Ethernet network interfaces are time synchronised. The apparatus may be a server device. The apparatus may comprise a plurality of second integrated circuits. The server device may be connected to a plurality of client devices. The client devices may comprise electronic control units.

According to a sixth aspect of the present invention there is provided a vehicle or an industrial system comprising the integrated circuits. The integrated circuits may be included in a server device. The server device may be connected to a plurality of client devices. The client devices may comprise automotive electronic control units.

The vehicle may be a motor vehicle. The motor vehicle may be a motorcycle, an automobile (sometimes referred to as a "car"), a minibus, a bus, a truck or lorry. The motor vehicle may be powered by an internal combustion engine and/or one or more electric motors.

According to a seventh aspect of the present invention there is provided a method of time synchronisation by a processor. The method comprises reading, via a non-Ethernet network interface (such as PCIe), a time, t1', of a hardware timer in a first integrated circuit (such as a switch), reading a local (or "captured") time, t2, of a hardware timer in second integrated circuit (which may contain the processor or be another, different integrated circuit, such as another switch), computing a timing offset, t2-t1, between a remote time, t1, which is dependent on the time, t1', and the local time, t2, and causing a change in operation of the hardware timer in the second integrated circuit in dependence on the offset.

The hardware timer may be a gPTP timer. The hardware timer may be included a synchronisation unit in an integrated circuit, for example, the second integrated circuit.

According to an eighth aspect of the present invention is provided a computer program comprising instructions for performing the method.

According to a ninth aspect of the present invention is provided a computer program product comprising a computer readable medium (which may be non-transitory) storing the computer program.

BRIEF DESCRIPTION OF THE DRAWINGS

Certain embodiments of the present invention will now be described, by way of example, with reference to the accompanying drawings, in which.

DETAILED DESCRIPTION

Figure 1:
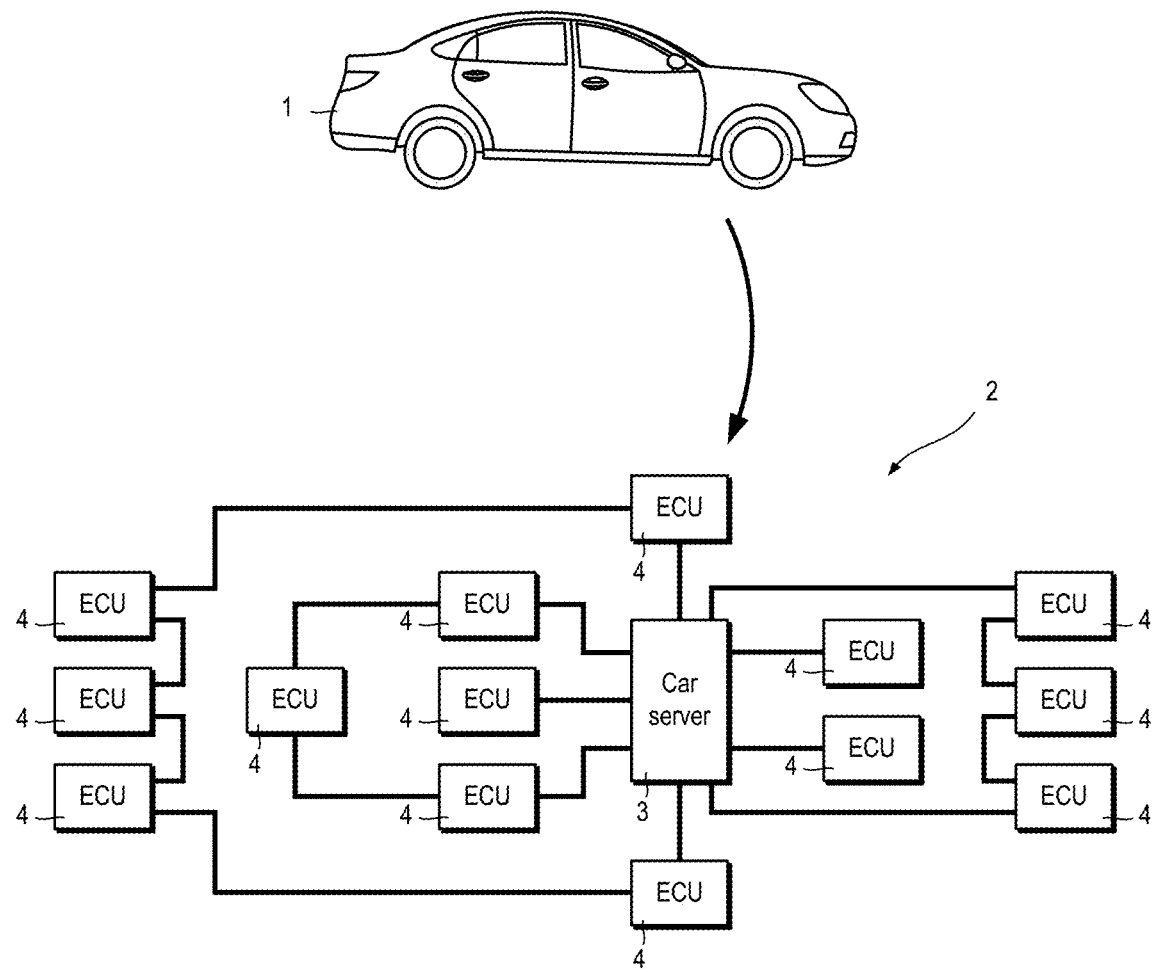
FIG. 1 is schematic block diagram of a vehicle containing a time-sensitive network including a central server.

Referring to FIG. 1, a vehicle 1 is shown which includes a time-sensitive network 2. The time-sensitive network 2 complies with IEEE 802.1AS which specifies a profile for using IEEE 1588-2008 for time synchronization.

The car network 2 includes a central server 3 (herein referred to as a "car server") and a plurality of automotive electronic control units (ECUs) 4, each typically taking the form of a microcontroller (not shown) and suitable peripherals (not shown). The ECUs 4 can include, among others, an engine control module, a powertrain control module, a transmission control module, a head unit (or "cockpit unit"), a telematic control unit (TCU), an in-vehicle infotainment ECU, a central gateway and the like. The network 2 can be configured in a number of different network topologies, such as ring, point-to-point or mesh. Some ECUs 4 are connected directly to the car server 3 and other ECUs 4 are connected to the car server 3 via one or more other ECUs 4.

The network 2 is based on an Ethernet backbone capable of supporting time-sensitive networking. As well as supporting IEEE 802.1AS which relates to time synchronization, the network 2 can support other time-sensitive networking standards such as IEEE 802.1Q-2018 or IEEE 1588.

Figure 2:
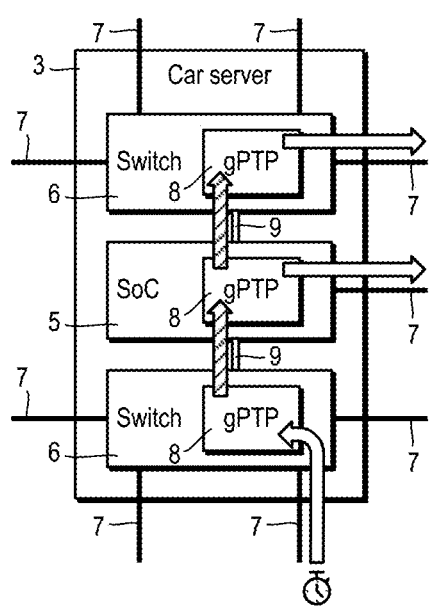
FIG. 2 is a schematic block diagram of a car server which includes a system-on-a-chip (SoC) and a plurality of switches providing Ethernet links, the SoC and switches having generalised Precision Time Protocol (gPTP) controllers and the switches connected to the SoC by peripheral component interconnect express (PCIe) links.

Referring to FIG. 2, the car server 2 is shown in more detail.

The car server 2 includes a system-on-a-chip (SoC) 5 and a plurality of switches 6 for providing interfaces via Ethernet links 7 (herein also referred to as Ethernet connections 7) to the ECUs 4. The SoC 5 may also have its own Ethernet connections. In other words, it may also provide interface(s) via Ethernet link(s) 7 to the ECU(s) 4. The SoC 5 and switches 6 each have a timing synchronisation unit 8 in the form of a generic Precision Time Protocol (gPTP) unit.

The switches 6 are connected to the SoC 5 by peripheral component interconnect express (PCIe) links 9. PCIe links 9 between the SoC 5 and switches 6 tend to be used instead of Ethernet links on the grounds of lower cost and higher speed.

As the car network 2 is time-sensitive, all the Ethernet connections 7 should have the same notion of time. IEEE 802.1AS is employed which uses a transparent clock involving clock forwarding. IEEE 802.1AS provides a mechanism on an Ethernet link to synchronise clocks. Since the PCIe link is not an Ethernet link, then IEEE 802.1AS cannot be applied. Thus, the aim is to find another way to synchronise the clocks and to allow transparent clock forwarding even if there is no Ethernet link.

Figure 3:
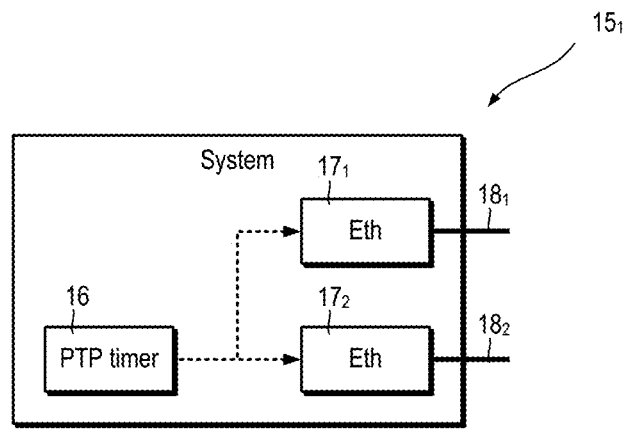
FIG. 3 is a schematic block diagram of a time-aware system in which two Ethernet interfaces share a common source of timing information.

Referring to FIG. 3, a first Ethernet system $15_1$ which is time-aware is shown.

The first Ethernet system $15_1$ includes a source 16 of timing information in the form of a PTP timer and first and second Ethernet interfaces $17_1$, $17_2$ providing respective Ethernet links $18_1$, $18_2$. In the first system, both Ethernet interfaces $17_1$, $17_2$ use the same source 16 for timing information. Thus, both Ethernet interfaces $17_1$, $17_2$ use the same notion of time.

Figure 4:
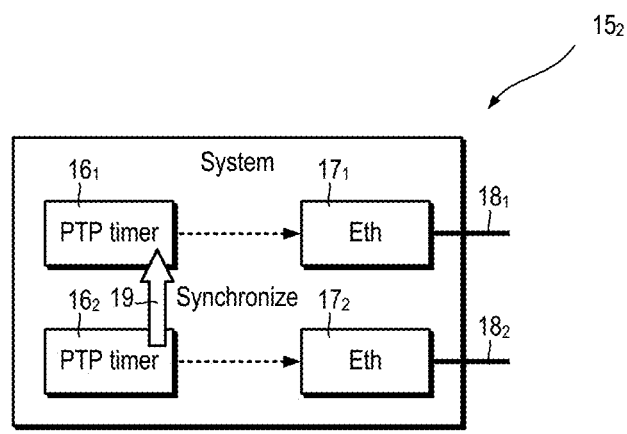
FIG. 4 is a schematic block diagram of a system in which two Ethernet interfaces have respective sources of timing information which should be synchronised to build a time aware system.

Referring to FIG. 4, a second Ethernet system $15_2$ is shown. The second system $15_2$ includes first and second timing information sources $16_1$, $16_2$ and first and second Ethernet interfaces $17_1$, $17_2$ providing respective Ethernet links $18_1$, $18_2$.

The first and second timing information sources $16_1$, $16_2$ are independent sources for timing information. There is no Ethernet connection between the timing information sources $16_1$, $16_2$ via Ethernet so IEEE 802.1AS cannot be used synchronization. Thus, if the first and second timing information sources $16_1$, $16_2$ are connected by PCIe, control area network (CAN) or universal asynchronous receiver-transmitter (UART) or other non-Ethernet bus system, the second system $15_2$ would not ordinarily be time-aware. For the second system $15_2$ to be time-aware, synchronization 19 of the timers $16_1$, $16_2$ is required. Through synchronisation, offset and rate information can be shared and so the timers $16_1$, $16_2$ can be coupled. PCIe and other similar buses, however, do not natively possess an appropriate mechanism for time synchronization.

Figure 5:
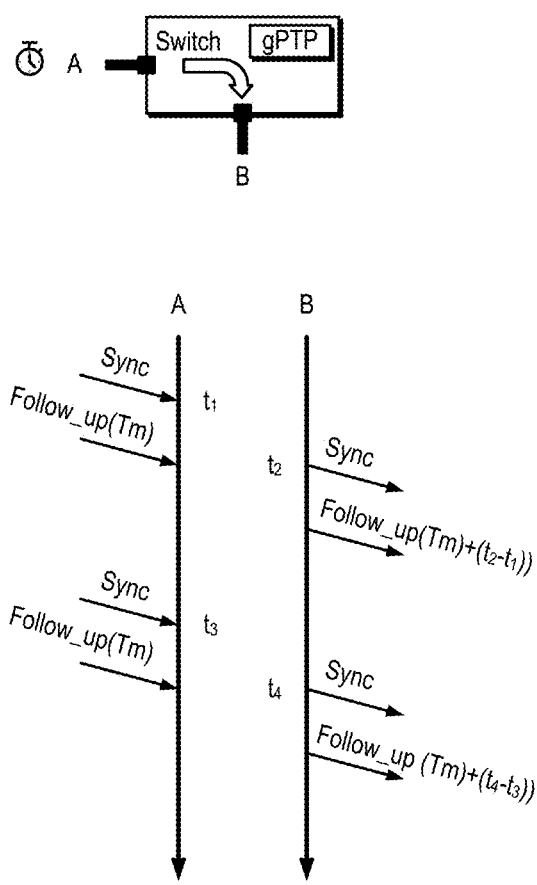
FIG. 5 schematically illustrates synchronisation through gPTP for transferring time.

Referring to FIG. 5, a process of synchronisation through gPTP for transferring time inside a switch or bridge which is useful for understanding the invention is shown.

A bridge, in this case a switch, includes a first, receiver-side link (labelled "A") and a second, transmitter-side link ("B") and a local gPTP unit which includes the gPTP timer. The first port A is also referred to as the "slave port" and the second port B is also referred to as the message port. The slave port A receives messages from a grandmaster GM (not shown), in particular Sync and Follow_Up. The Follow_Up message contains the transmission time (Tm) of a Sync message according to grandmaster's clock, the sum of path delay and resident time in GM time base. The Follow_Up message is also used to transmit the cumulative rate ratio between the grandmaster and the time-aware system transmitting it.

Synchronisation includes three aspects, namely initial synchronization, rate correction, and path delay measurement which are used to achieve a transparent clock.

In initial synchronization, the local gPTP unit calculates an offset between it (i.e., the local gPTP unit) and master (not shown). The software gets t1 as a timestamp from the Ethernet port and Tm from a field inside the Follow_Up frame. The initial offset is (t2−t1)+Tm and can be directly used to program the offset. The need to read the timer depends on implementation. For example, a bridge can include a dedicated offset register that the software can write and so there is no need to shift the timer. Offset correction, however, does not perfectly align slave to master due to factors such as path delay and compute time.

In rate correction, the local gPTP unit calculates rate correction based on the difference between slave and master view rate. The local gPTP unit adjusts the local increment. Over time, the slave adjusts to master. Even if the master and slave use the same clock source, rate correction is required to compensate the initial offset synchronisation error.

In path delay measurement, the local gPTP unit calculates the transit time of packages from transmitter to receiver side based on parameters such as PHY propagation time and time-of-flight (TOF). This is used to clarify the timing information obtained by Sync frame. Path delay in IEEE 802.1AS influences the rate/offset measurement.

The grandmaster clock is forwarded transparently across switches and time information forwarding is based on hardware timestamps. A transparent clock means that there is no hop-by-hop synchronisation of the local timers as this would result in cascaded regulators inside the network and so result in so-called "swinging". In a transparent clock, the grandmaster always keeps the reference. As only residence time (t2−t1) is provided and both time stamps close together, an inaccuracy of the local time is negligible. This is why the timers need to be well-synchronised. Any offset is passed on through the network.

Figure 6:
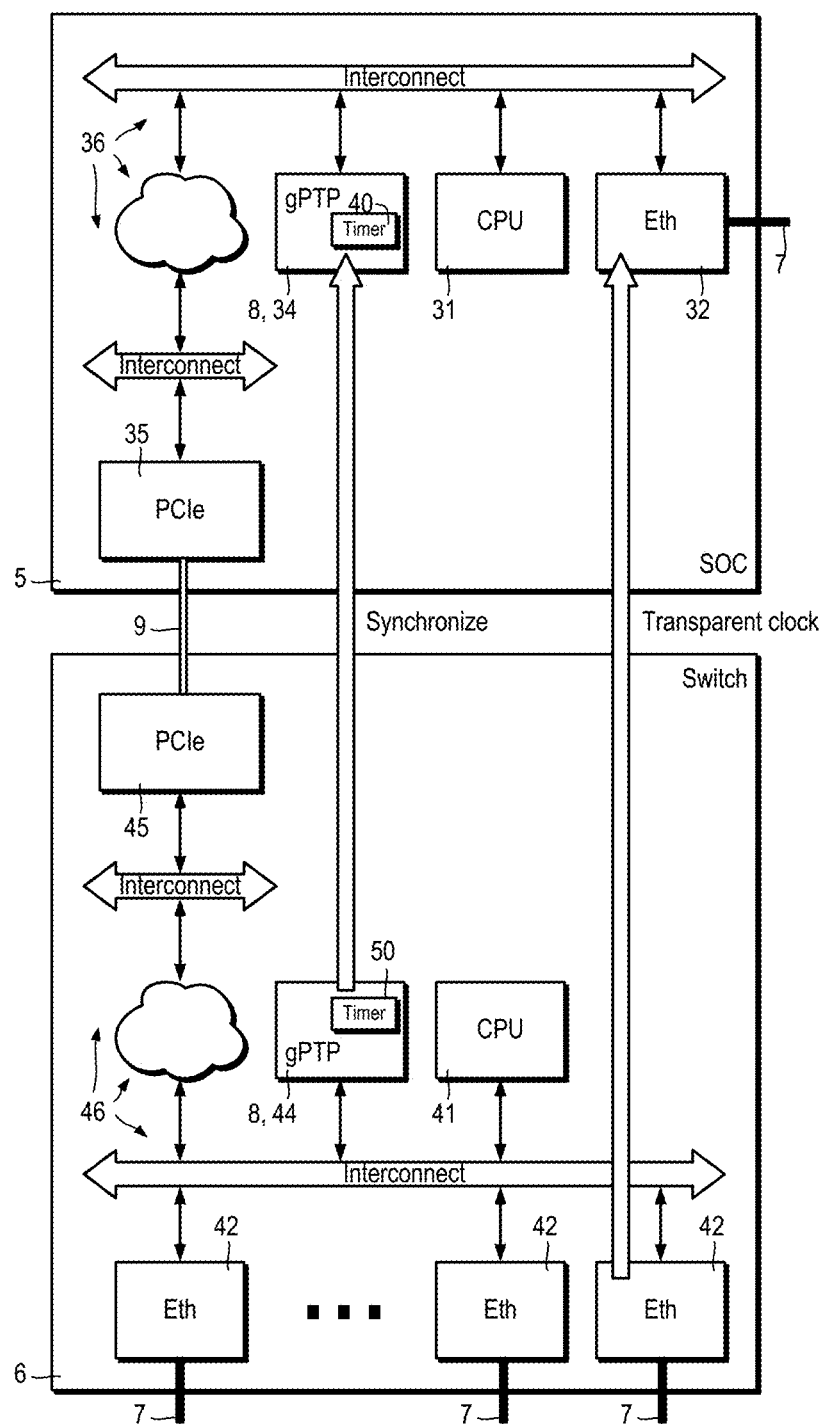
FIG. 6 is a schematic block diagram of a SoC and a switch connected by a PCIe link and illustrating a requirement to synchronise gPTP units to allow transparent clock forwarding.

Referring to FIG. 6, an SoC 5 and a switch 6 connected by a PCIe link 9 are shown.

The SoC 5 includes a CPU 31, an Ethernet interface 32 for Ethernet connection 7 and a gPTP unit 8, 34 and PCI-Express bus controller 35 interconnected by a bus system 36 including interconnects and may include bus bridges. The SoC 5 may have more than one Ethernet interface. The SoC 5 may have no Ethernet interface 32. The gPTP unit 8, 34 includes a timer 40. For the sake of clarity, other components including memory and peripheral modules, are not shown.

The switch 6 includes an optional CPU 41, a plurality of Ethernet interfaces 42 for Ethernet connections 7 and a gPTP unit 8, 44 and PCI-Express bus controller 45 interconnected by a bus system 46 including interconnects. The gPTP unit 8, 44 includes a timer 50. For the sake of clarity, other components are not shown. If the switch CPU 41 is omitted, then the SoC CPU 31 may perform functions on its behalf. The switch CPU 41 may be used for configuring the switch, monitoring, advanced data handling and gPTP.

As will now be explained in more detail, the system is arranged to transfer current time from the switch 6 to the SoC 5, in other words, to keep the switch 6 and SoC 5 synchronized through rate and offset information, and to operate a transparent clock involving residence time on common time base, grandmaster and SYNC frame and, thus, provide a time-aware system.

It is noted that simply reading gPTP timer adds an unpredictable offset. This can arise for a number of different reasons including PCI Express queuing, internal transfer time including transfer time through interconnect 36, 46 and CPU processing. In gPTP, the initial offset is compensated through rate correction based on precise hardware timestamps. However, these are not available here and so ordinarily there is no transparent clock.

Each gPTP timer 40, 50 is split into two parts, namely a second part (which may be 48 bits) and a nanosecond part (which may be 30 bits).

The gPTP units 8, 34, 44 each generate a respective "pulse per second" (pps) (or "1 pps") signal which provide an event when the second part of the gPTP timer is incremented. pps is used since it commonly available in most devices providing gPTP capability to allow simple diagnostic of clock synchronisation status of a network. Although the name suggests that the event rate of the signal is 1 s$^{-1}$, it need not be and may have a different rate, for example, being higher or lower than 1 s$^{-1}$. The event rate may programmable and can be set depending on the application.

Comparing the point in time when the counter is incremented on the SoC and switch side can be used to judge the quality of the time synchronization using an oscilloscope.

Figure 7:
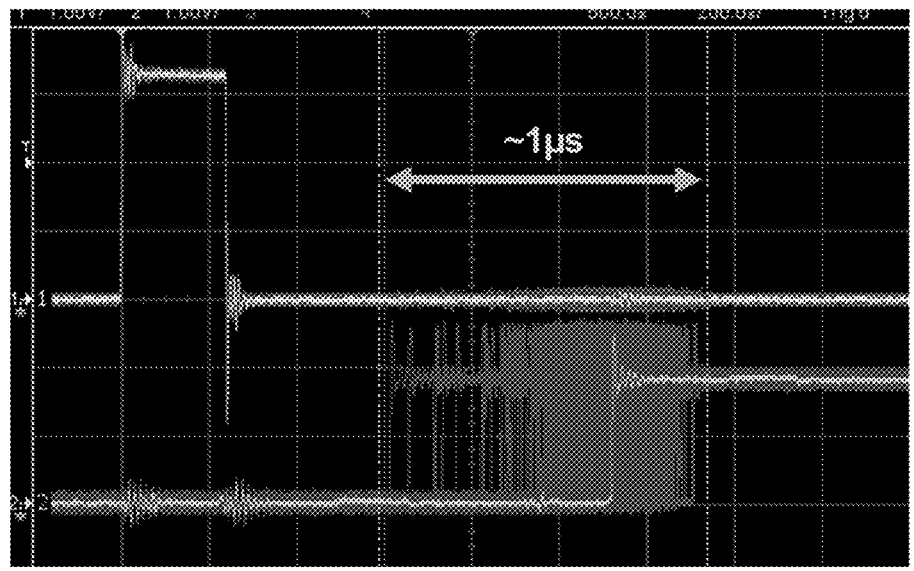
FIG. 7 is a measurement of jitter for remote gPTP over PCIe by reading gPTP timer.
Figure 8:
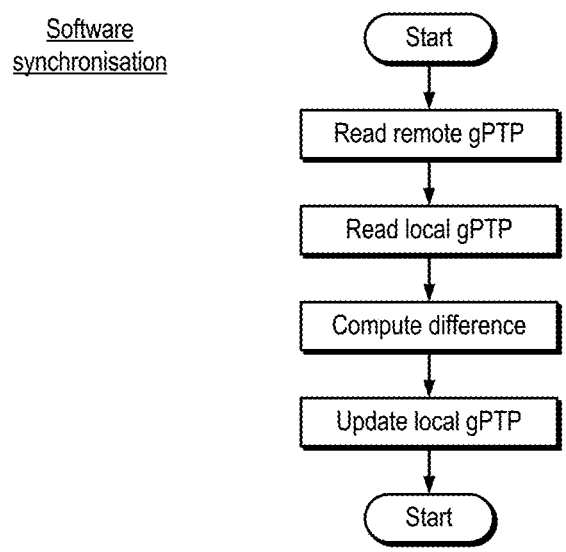
FIG. 8 is process flow diagram of a simplified process of getting variation in access time.

FIG. 7 shows an oscillator trace measuring first and second pps outputs for a switch and SoC respectively by synchronising the gPTP timers in software using a method shown in FIG. 8. The method includes reading the remote gPTP timer, reading the local gPTP timer, computing the difference and updating the local gPTP.

On a first channel (appearing on the top in FIG. 7), a trigger is set on a first pps output from the switch. The second channel is the signal of the other pps output. The pps is allowed to run to see how the relation between the first and second pps outputs varies over time.

An offset can be seen between master and slave. The event time of the first channel is fixed and jitter of the second channel can be seen. The size of jitter can also be ascertained. In this case, the jitter is about 1 µs and shows that access time is not deterministic.

During the measurement, the PCIe is idle (i.e., there is no other traffic on the PCIe bus and PCIe controller) and the SoC is also idle (i.e., no other processes are running on the CPU and bus system). If the PCIe were not idle, then there would be even higher jitter due to queuing effects. If the CPU were not idle, then other processes could cause the interconnect 36 to be busy and, thus, have an effect on read access time.

The achievable accuracy between the timers is above the typical gPTP accuracy, which is in region of 100 ns. As the difference between the timers distort the residence time calculation, transparent clock forwarding is not possible.

Although an improved form of software synchronisation (compared to that shown in FIG. 8) might help to improve accuracy and reduce synchronisation error, the synchronisation error is still not deterministic. In any case, if the CPU kernel, for example, transfers some image data over the same internal bus, then this has the effect of delaying reading of the gPTP timers.

Thus, it is apparent that synchronisation cannot be achieved in software.

Two approaches which provide sufficient accuracy will now be described. Both approaches employ additional hardware to provide a hardware-based channel for measuring time relations. One approach involves using hardware capture and compare units which allow timer capture on one side and timer compare on the other side and so enable a path delay measurement to be taken and synchronisation to be achieved. This can be used not only for PCIe but also other forms of bus connectivity, such as SPI or any form of PTP aware PHYs. Another approach is to enhance the PCIe link with a PTP timer-based precision timing measurement (PTM). Thus, PTM can be used to tunnel gPTP over PTM and use it on the destination side.

Synchronisation Using a Timing Trigger

Figure 9:
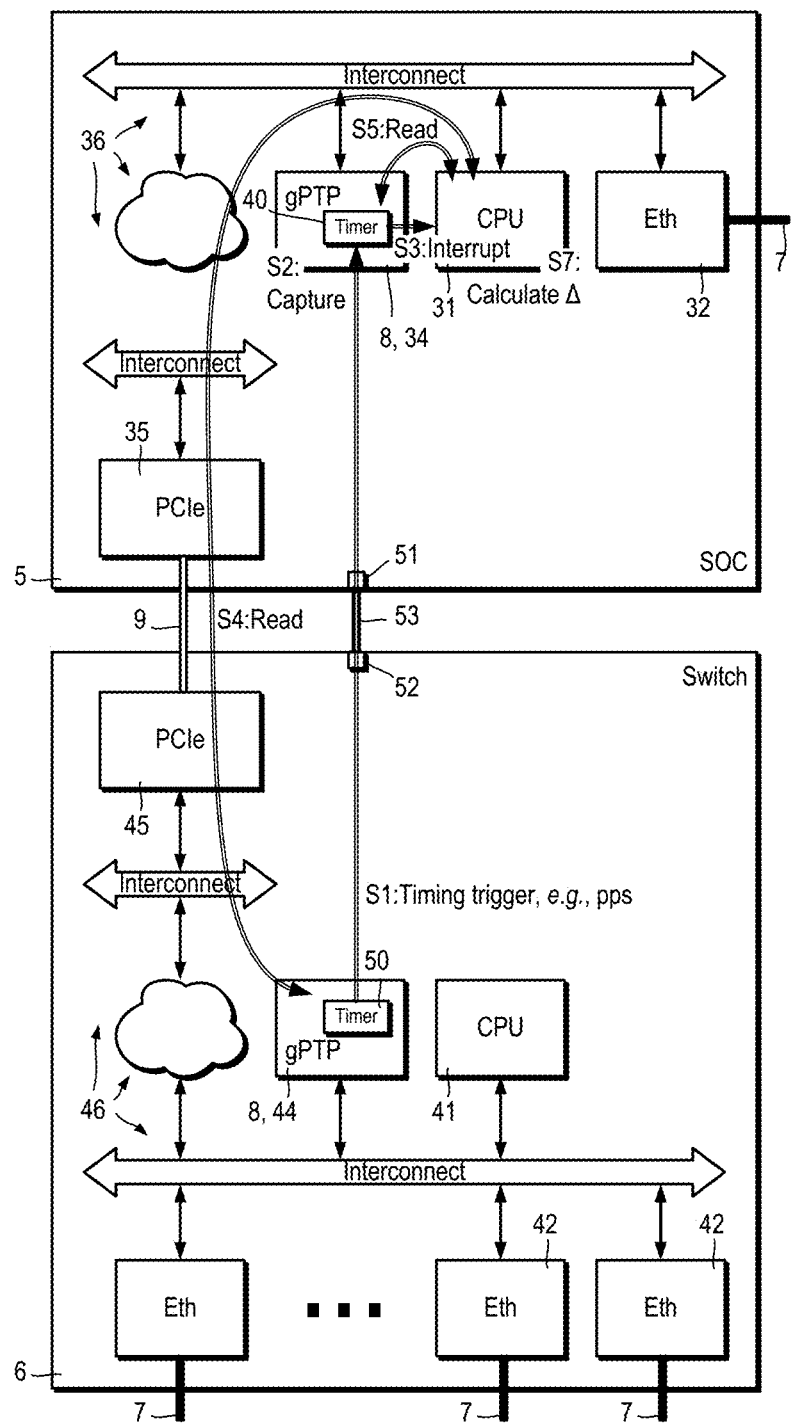
FIG. 9 schematically illustrates measuring a timing offset between master and slave using pulse per second (pps)

Referring to FIG. 9, the SoC 5 and switch 6 are again shown.

An existing interface signal is used as a reference point. In this case pulse per second output (pps), via general purpose I/O pins 51, 52 on the SoC 5 and switch 6, respectively, connected by a wired link 53. The wired link 53 has a known timing behaviour, preferably having a constant timing behaviour. The wired link 53 preferably is exclusively used for connecting I/O pins 51, 52 (in other words, not be shared). Registers and or level shifter may be included.

Figure 10:
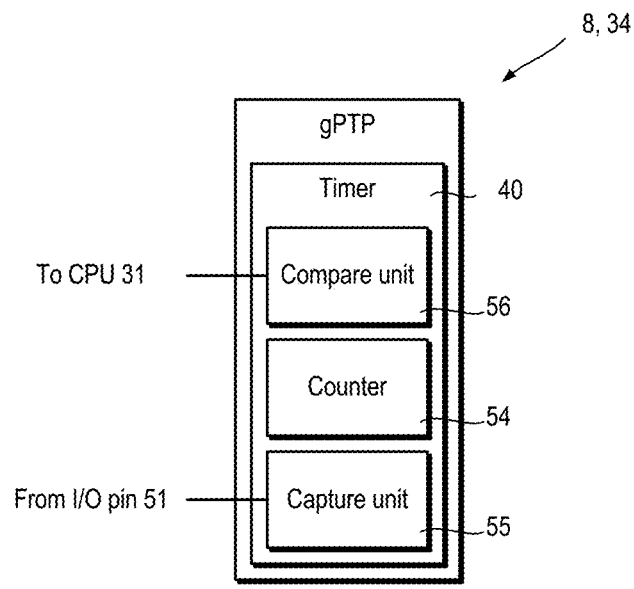
FIG. 10 is a schematic block diagram of an SoC-side gPTP unit.
Figure 11:
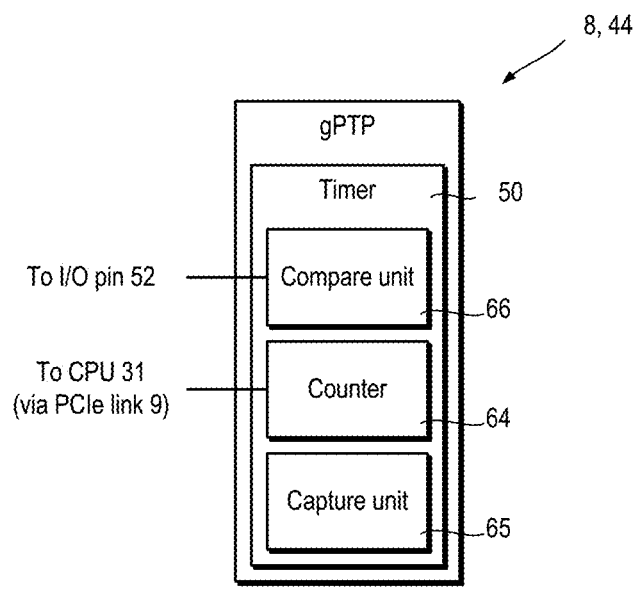
FIG. 11 is a schematic block diagram of an switch-side gPTP unit.
Figure 12:
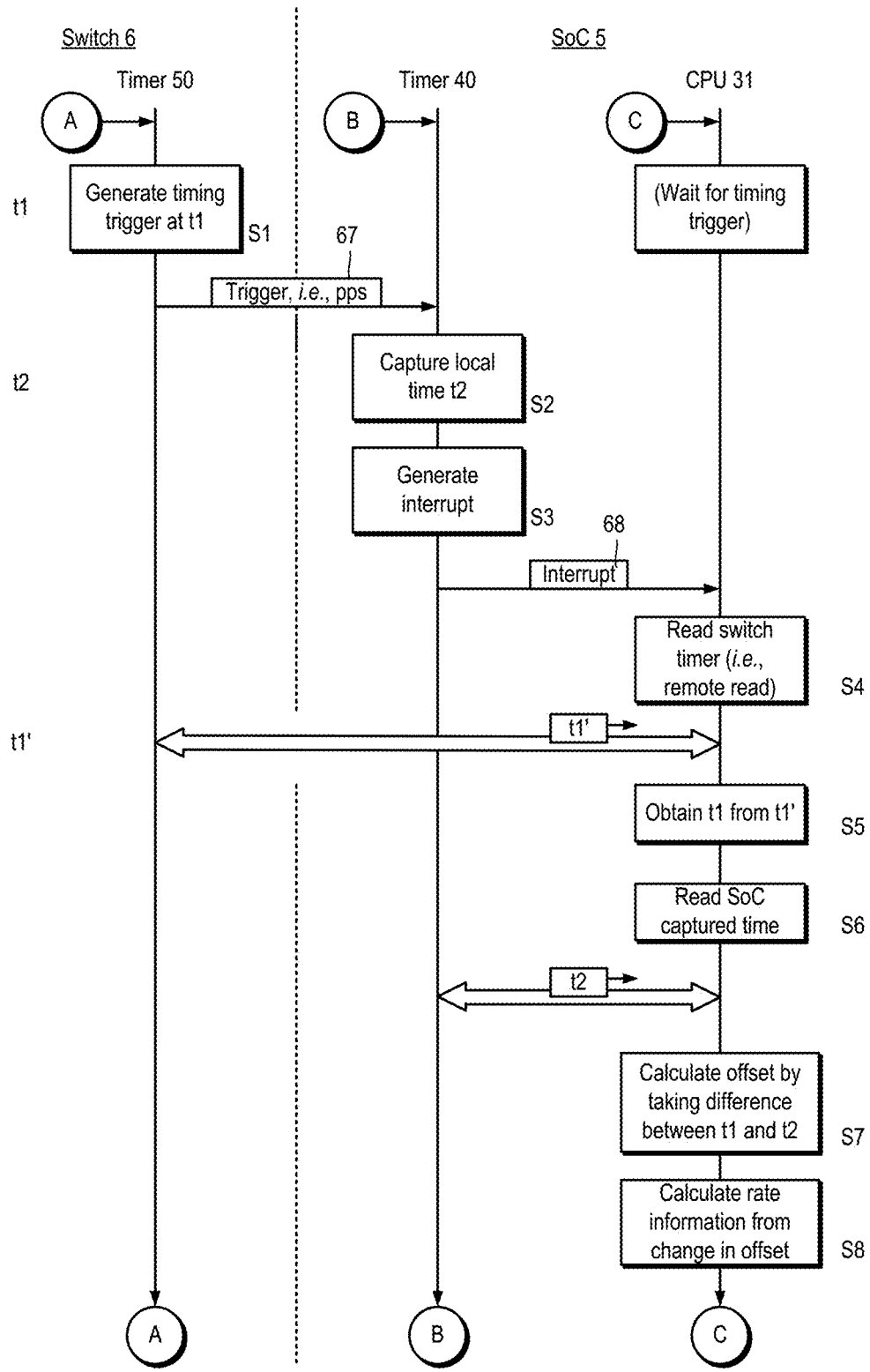
FIG. 12 is process flow diagram of a method of measuring a timing offset between master and slave using pps.

Referring also to FIGS. 10 and 11, the gPTP unit 8, 34, 44 each have a respective timer 40, 50. Using the example of the SoC-side gPTP timer 40, the timer 40 includes a counter 54, a capture unit 55 and a compare unit 56. In some cases, the capture and compare units 55, 56 can be integrated into a single unit. Likewise, the switch-side gPTP timer 50 includes a counter 64, a capture unit 65 and a compare unit 66.

The SoC-side gPTP capture unit 55 is used to store a local view of time. In the case of the SoC-side gPTP timer 40, the I/O pin 51 is connected to the capture unit 55 and is used to store current local gPTP time in response to a trigger, namely the rising or falling edge of a pps. Comparing the difference between local gPTP and remote gPTP time provides offset information. Comparing change in the offset over time provides rate information.

Referring to FIGS. 9, 10, 11, 12 and 13, the switch-side gPTP timer 50 (i.e., the remote timer) generates a timing trigger 67 at t1 (step S1) which is transmitted, via wired link 53, to the SoC-side gPTP timer 40. Reception of the timing trigger 67 by the capture unit 55 of the SoC-side gPTP timer 40 causes it to capture its local time t2 (step S2). The timing trigger 67 causes an interrupt 68 after capture (step S3) For example, the interrupt 67 may be generated by the timer 40 (step S3). In response to the interrupt 68, the CPU 31 reads remote time t1' via, for example, the PCIe link (step S4). Other links, such as PCI, SPI or the switch configuration and control interface can be used instead. The CPU 31 obtains t1 from t1' (step S5). The read switch-side time t1' is preferably rounded down to a known trigger granularity to obtain t1. For example, if a trigger comes every second, a read value of 4.123456789 s (t1') is rounded down to 4.00 (t1'). In some embodiments t1 is captured by timer 40 and the CPU reads t1. The CPU 31 also reads the captured time t2 from the capture unit 55 (step S6). The CPU 31 then calculates a difference in times t1, t2 to obtain offset information (step S7). The process is repeated to obtain new offset information. CPU 31 can determine the change in offset over time to obtain provides rate information (step S8).

Capturing and reading t1 (as opposed to t1') can be used to compensate for the quantization error on the switch-side timer. The timer is incremented with a given clock granularity. Assume, for example, that the current timer is 9.999999 s and increment value is 12.5 n, then pps would be generated at next increment value, namely 10.0000000124. Thus, there is an error of 12.4 ns. If switch side time, t1, is captured, then it is possible to compensate for such an error.

Thus, the gPTP timer unit 50 may provide a mechanism to provide the quantization error of the pps signal either by capturing the time when the pps signal was generated or storing the quantization error inside the timer unit 50. When providing a second pps signal in the opposite direction, the path delay can be measured, and accuracy improved further.

Figure 13:
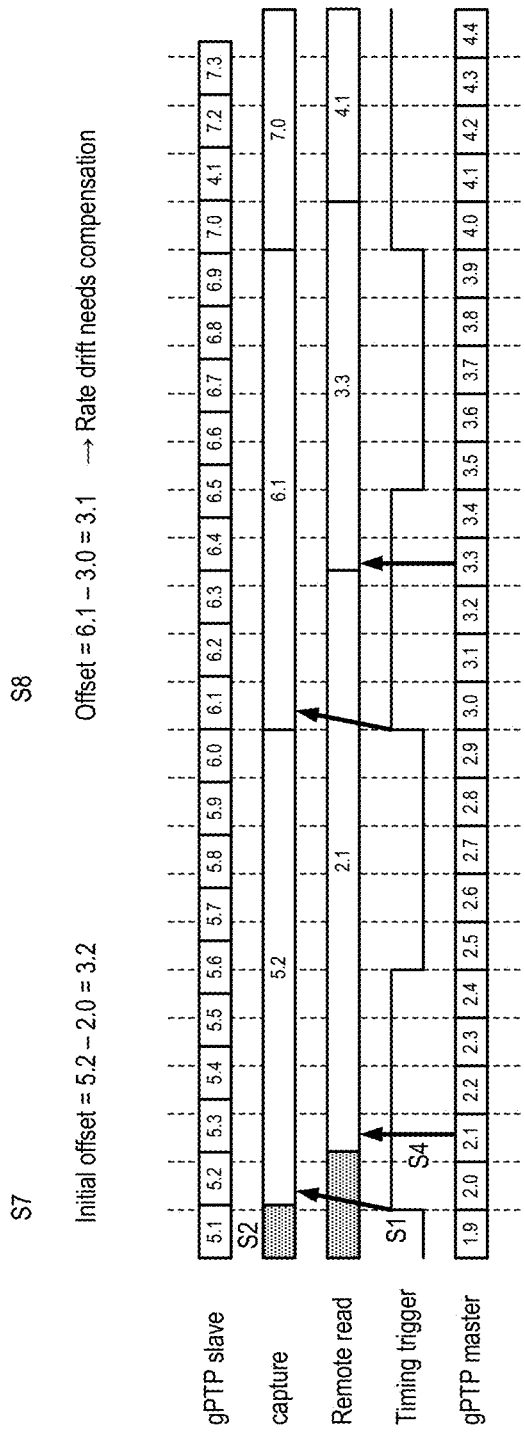
FIG. 13 is a timing chart with exemplary values illustrating measuring a timing offset between master and slave using pps.

Referring to FIG. 13, a timing chart is shown giving illustrative values.

As explained hereinbefore, the CPU 31 (FIG. 9) measure offset between the master and slave. The timing trigger, i.e., pps pulse, in combination with a remote read (in the case, 2.1) is used to identify the second (in this case, 2.0). The captured time (in this case, 5.2) is used to calculate the offset. Observing a change of local time compare to remote time (for example, from 3.2 to 3.1, resulting in a change of 0.1) allows the CPU 31 to calculate rate. The resulting offset and rate values are used to maintain local gPTP time in software and use this time when forwarding time information to connected slaves.

Figure 14:
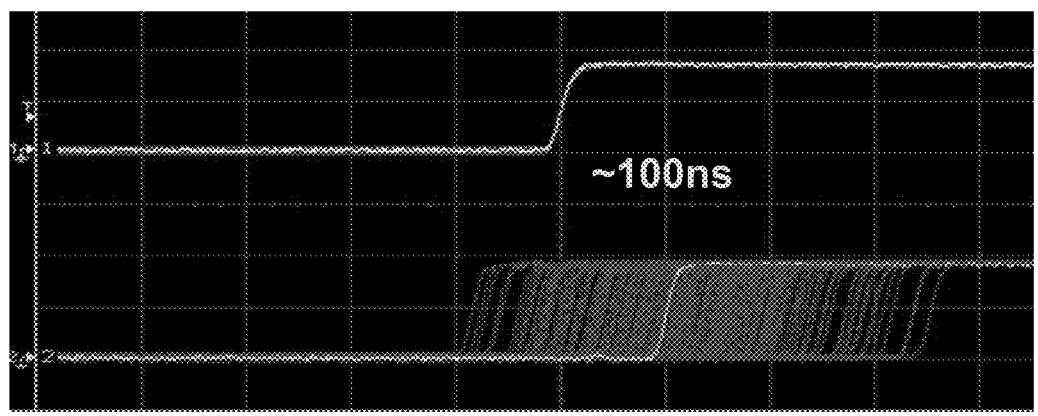
FIG. 14 is a measurement of pps jitter using gPTP.

Referring to FIG. 14, a jitter reading of remote gPTP over PCIe whereby synchronization is achieved through pps extension is shown. As shown in FIG. 14, there is a jitter of about 100 ns. Thus, accuracy is comparable with gPTP so resulting in a transparent clock. It is noted that capture units may be used with Audio Video Transport Protocol (AVTP) time instead of gPTP time. AVTP and gPTP present the time format differently: gPTP uses a 48-bit second and 30-bit ns format, whereas AVTP uses (IEEE 1722) 32-bit or 46-bit ns format. Capture units may be used with any other common time format between master and slave.

When the trigger 67 is aligned to the Sync messages from grandmaster, the deviation between both timers is known precisely and a much better accuracy for residence time calculation can be achieved as compared with free running timer synchronisation.

Synchronisation Using Precision Time Measurement (PTM) Protocol

Precision time measurement (PTM) can be used to coordinate precisely events across multiple components with independent local time clocks. It is an optional feature of PCIe.

Figure 15:
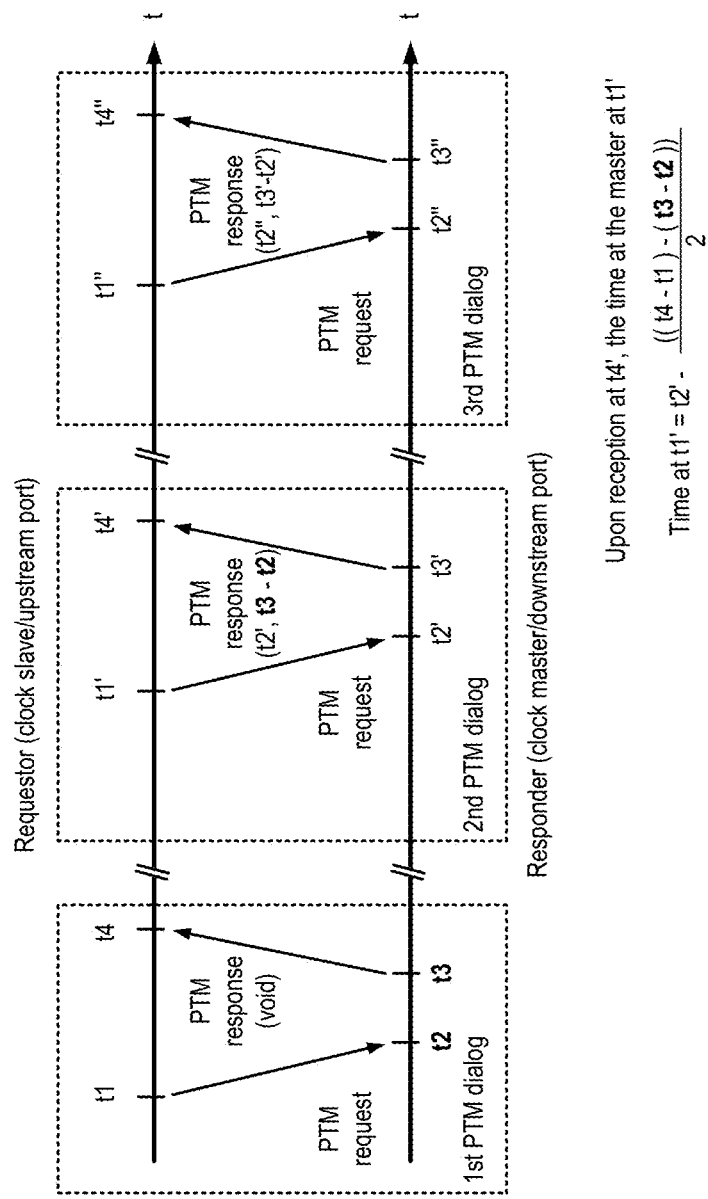
FIG. 15 illustrates precision time management (PTM) link protocol.

Referring to FIG. 15, a PTM link protocol between an upstream port (which acts on behalf of a PTM Requester) and a downstream port (which acts on behalf of a PTM Responder) is shown. Timestamps t1, t2, t3, and t4 are captured locally by each port as they transmit and receive PTM Messages. A component associated with each port stores these timestamps from a first PTM dialog in internal registers for use in a second PTM dialog, and so on for subsequent PTM dialogs.

An upstream port initiates a PTM dialog by transmitting a PTM Request message. A downstream port has knowledge of or access directly or indirectly to a PTM Master Time. During each dialog, the downstream port populates a PTM ResponseD message based on timestamps stored during previous PTM dialogs. Once each component has historical timestamps from the preceding dialog, the component associated with the upstream port can combine its timestamps with those passed in the PTM ResponseD message to calculate the PTM Master Time using the equation:

$$\text{PTM master time at } t1'=t2'-((t4-t1)-(t3-t2)/2) \tag{1}$$

The PTM time stamps t1, t2, t3, t4 are based on a local clock, typically with a timer resolution of 1 ns. The PTM timer and transfer size is 64 bits. PTM can be used to determine local time of responder including offset, rate difference between requestor and responder clock and approximate propagation time. However, there is no link to the gPTP timer and no common view on time. Therefore, PTM is unable to calculate the rate between two gPTP timers.

Figure 16:
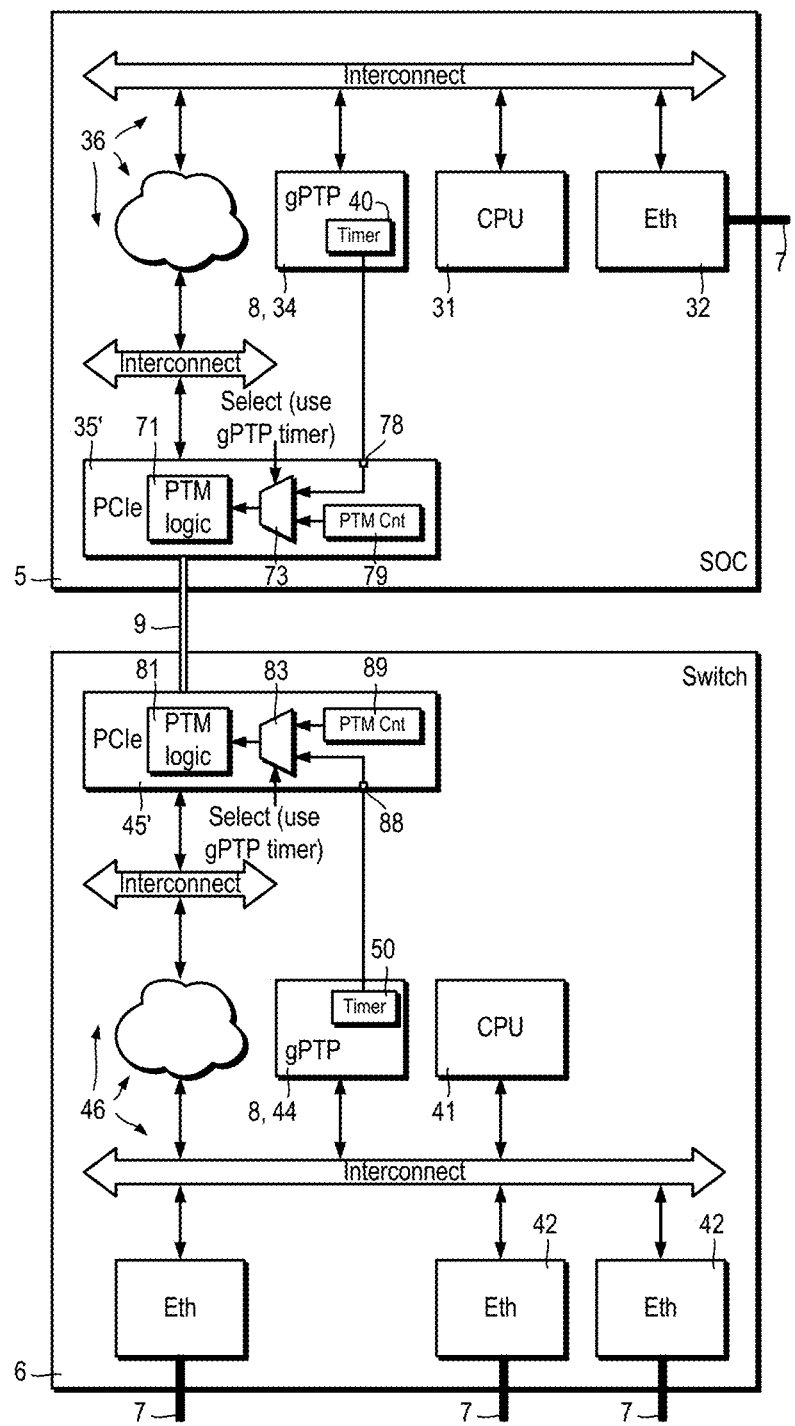
FIG. 16 schematically illustrates measuring a timing offset between master and slave using PTM.

Referring to FIG. 16, an SoC 5 and a switch 6 connected by a PCIe link 9 are shown.

The SoC 5 and a switch 6 are similar to that hereinbefore described earlier in relation to FIG. 9. However, in this case, the SoC 5 and switch 6 have modified PCIe bus controllers 35', 45' and the gPTP timers 40, 50 (which may or may not have capture and compare units) are connected to the modified PCIe bus controllers 35', 45'.

The SoC PCIe bus control 35' includes PTM logic 71 having a counter input, a multiplexer 73 having first and second inputs, a select input and an output, an input 78 for receiving the gPTP timer value from the gPTP timer 40 and a PTM counter 79.

Likewise, the switch PCIe bus control 45' includes PTM logic 81 having a counter input, a multiplexer 83 having first and second inputs, a select input and an output, an input 88 for receiving the gPTP timer value from the gPTP timer 50 and a PTM counter 89.

Thus, the PTM link protocol can be performed using timestamps based on the gPTP timers 40, 50. Although gPTP defines time using 80 bits and PTM provides only 64-bit timestamps, only the lower 64 bits of the gPTP time are connected to the multiplexer 73, 83. The remaining bits can be transferred by reading the gPTP time without affecting the accuracy of the time synchronization due to the low update frequency of the upper 16-bits of gPTP time.

Figure 17:
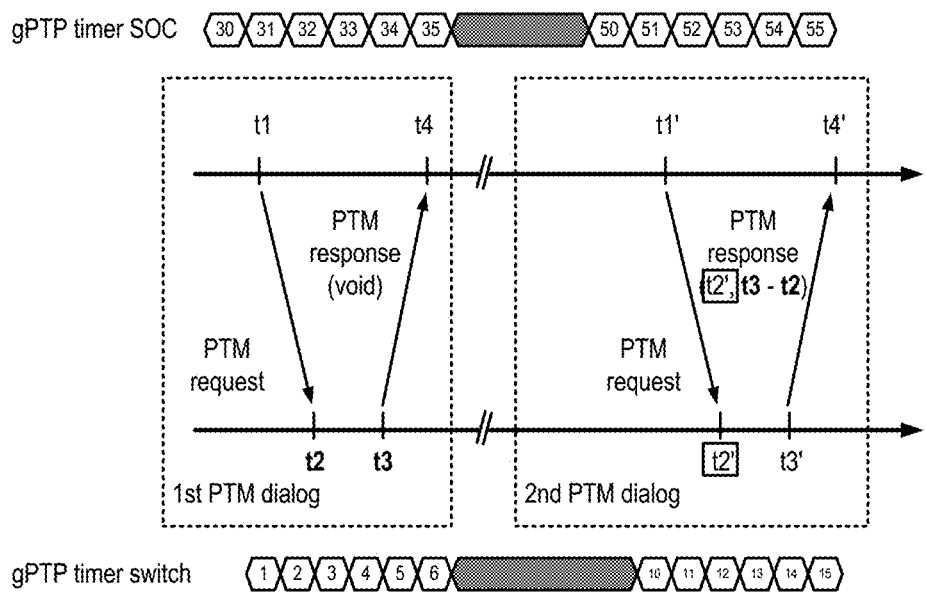
FIG. 17 illustrates PTM link protocol and gPTP timers.

Referring to FIG. 17, upon reception of response at t4', the PTM logic 71 can determine the gPTP time of the master at time t1 '. At the slave side, the local time t1' is known and so an offset between the gPTP times 40, 50 can be calculated and, based on multiple offsets, the rate can be determined. The information can be used to calculate an accurate residence time.

Figure 18:
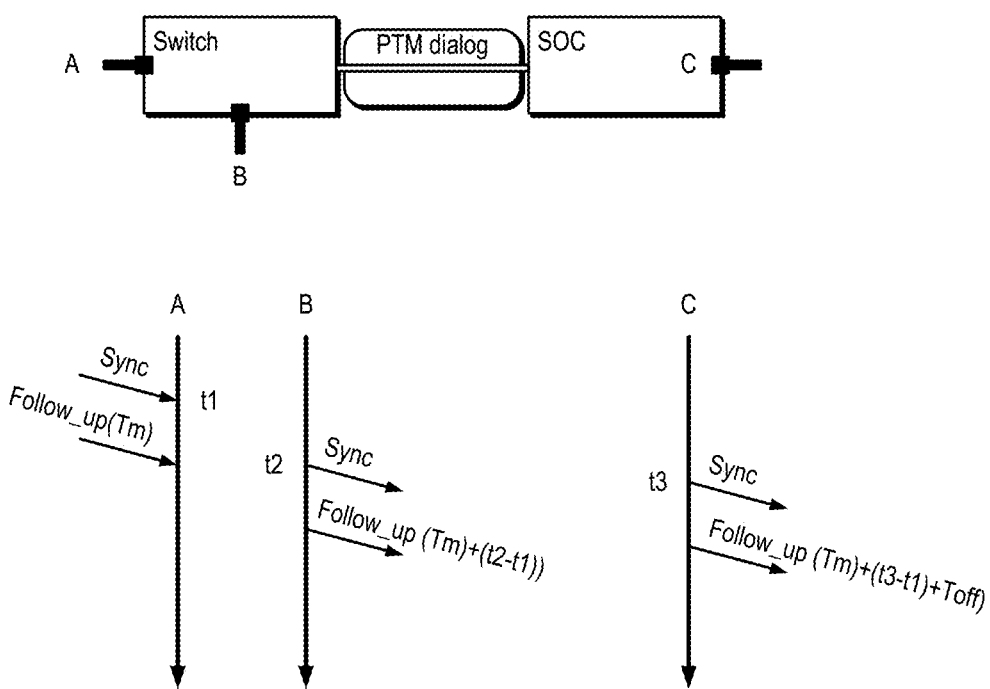
FIG. 18 schematically illustrates synchronisation through gPTP through PTM for transferring time.

Referring to FIG. 18, the PTM dialog provides a common view of time between the SoC 5 and switch 6. In particular, the PTM dialog provides offset and rate information.

When the switch 6 receives a SYNC request and timestamp information from the grandmaster, it forwards the SYNC request and timestamp information to the SoC 5. Using the PTM information, it is possible to calculate residence time used for the PTP frames.

With rate and offset information gained from the PTM dialog, the gPTP time on the SoC side is controlled using same way as defined in IEEE 802.1AS.

PTM dialog is executed at least once before synchronization messages are received by the SoC 5.

During operation time, the PTM dialog continues to compensate rate drift between master and slave caused by the oscillator. Further rate and offset correction are used to correct over- or under-compensation of rate correction.

Best accuracy can be achieved when a SoC 5 initiates a PTM cycle right after a reception of a SYNC message when synchronising PTM to a gPTP grid. From this PTM dialog, the actual offset between master and slave is gained which is included in the SoC's follow-up frame to calculate residence time.

Modifications

It will be appreciated that various modifications may be made to the embodiments hereinbefore described. Such modifications may involve equivalent and other features which are already known in the design, manufacture and use of time-aware networks and component parts thereof and which may be used instead of or in addition to features already described herein. Features of one embodiment may be replaced or supplemented by features of another embodiment.

The SoC may be connected to two or more switches, for example, by two or more PCIe interfaces, and may perform time synchronisation for the two or more switches.

There may be more than one non-Ethernet network interface. For example, there may be more than one PCIe interface. There may also be SPI interfaces.

A switch-side CPU may generate the timing trigger and to transmit the timing trigger to the other SoC.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. An integrated circuit comprising:
a timing synchronisation unit comprising a hardware timer;
a non-Ethernet network interface configured to communicate with another integrated circuit having another hardware timer; and
a processor,
wherein:
the timing synchronisation unit is configured, in response to receiving a timing trigger generated at time t1 from the other integrated circuit via a wired link, to capture a local time t2 using the hardware timer and provide the local time t2 to the processor;
the timing synchronisation unit is configured to, in response to receiving the timing trigger, generate an interrupt;
the processor is configured to receive the interrupt and, in response to receiving the interrupt, read the other hardware timer via the non-Ethernet network interface to obtain a remote time t1'; and
the processor is configured to compute a timing offset between a remote time obtained from the remote time t1' read from the other hardware timer via the non-Ethernet network interface and the local time t2 for time synchronisation.

2. The integrated circuit of claim 1,
wherein the non-Ethernet network interface comprises a peripheral component interconnect express (PCIe) interface.

3. The integrated circuit of claim 1, further comprising:
a time-sensitive networking Ethernet network interface.

4. The integrated circuit of claim 3,
wherein the time-sensitive networking Ethernet network interface complies with IEEE 802.1AS.

5. The integrated circuit of claim 3,
wherein the time-sensitive networking Ethernet network interface complies with IEEE 802.1Q-2018 or IEEE 1588.

6. The integrated circuit of claim 1,
wherein each of the hardware timer and the other hardware timer is a Precision Time Protocol (PTP) timer or a generalised Precision Time Protocol (gPTP) timer.

7. The integrated circuit of claim 1,
wherein the timing trigger is generated cyclically, on demand and/or in response to an event.

8. The integrated circuit of claim 1,
wherein the processor is configured to cause a change in operation of the hardware timer in dependence on the timing offset.

9. The integrated circuit of claim 1, further comprising:
a pin for receiving the timing trigger; and
a path for transmitting the timing trigger from the pin to the timing synchronisation unit.

10. An integrated circuit comprising:
a time-sensitive networking Ethernet network interface;
a timing synchronisation unit comprising a hardware timer; and
a non-Ethernet network interface configured to communicate with another integrated circuit having another hardware timer,
wherein:
the timing synchronization unit is configured to generate a timing trigger at time t1 and to transmit the timing trigger to the other integrated circuit via a wired link such that the other integrated circuit, in response to receiving the timing trigger, captures a local time t2 using the other hardware timer, provides the local time t2 to a processor, and generate an interrupt;

the timing synchronisation unit is configured to, in response to the interrupt, provide a remote time t1' to the processor via the non-Ethernet network interface for the processor to compute a timing offset between a remote time obtained from the remote time t1' via the non-Ethernet network interface and the local time t2 for time synchronisation.

11. The integrated circuit of claim 10,
wherein the non-Ethernet network interface comprises a selector for selecting between the time from the hardware timer and another internal timer in the non-Ethernet network interface.

* * * * *